United States Patent [19]

Johnston

[11] Patent Number: 5,008,161

[45] Date of Patent: Apr. 16, 1991

[54] BATTERY ASSEMBLY

[76] Inventor: Lowell E. Johnston, 11515 Welebir St., Loma Linda, Calif. 92354

[21] Appl. No.: 304,953

[22] Filed: Feb. 1, 1989

[51] Int. Cl.⁵ .......................... H01M 2/06; H01M 2/08
[52] U.S. Cl. ........................................... 429/7; 429/94
[58] Field of Search ................. 429/7, 61, 62, 94, 185, 429/271

[56] References Cited

U.S. PATENT DOCUMENTS

| | | | |
|---|---|---|---|
| 3,650,842 | 3/1972 | Bougaran | 136/134 |
| 3,907,588 | 9/1975 | Bergum | 429/7 |
| 4,028,478 | 6/1977 | Tucholski | 429/61 |
| 4,053,687 | 10/1977 | Coibion et al. | 429/94 |
| 4,227,701 | 10/1980 | Tsuchida et al. | 429/185 |
| 4,433,361 | 2/1984 | Wolf et al. | 361/433 |
| 4,605,605 | 8/1986 | Cannone | 429/174 |
| 4,606,983 | 8/1986 | Milewski et al. | 429/164 |
| 4,816,355 | 3/1989 | Kulibert et al. | 429/174 |

FOREIGN PATENT DOCUMENTS 58-154178 9/1983 Japan .

Primary Examiner—Donald L. Walton
Attorney, Agent, or Firm—Lyon & Lyon

[57] ABSTRACT

A battery cell including a cylindrical container having a cap assembly positioned in the open end thereof. The cap assembly includes a terminal extending into the container, a rigid plate, a thermal disconnect assembly and a contact cap. A seal fits about the cap assembly to electrically isolate the cap from the container and provide a sealing function and vent for the battery. A sleeve is associated with the seal to tightly seal the terminal. The terminal is associated with a spiral wrapped cell by means of a tab welded thereto. The cell is assembled in a flat layered arrangement and then wrapped about the terminal prior to placement in the container.

17 Claims, 2 Drawing Sheets

BATTERY ASSEMBLY

BACKGROUND OF THE INVENTION

The field of the present invention is dry cell batteries and their structure.

Dry cell batteries typically employ a container with a closure element in one end thereof. The container acts as one terminal while the closure element is electrically isolated from the container to act as the second terminal. Such operation of the closure element dictates its electrical isolation from the container, requires its coupling with either the anode or cathode of the cell structure itself, provides a closure of the container against leakage and internal overpressure and, particularly in the case of lithium cells, can include a thermal disconnect assembly to shut down the battery in the event of excessive internal heat. The battery container must also cooperate to provide appropriate containment and reliable contact with the other of the anode or cathode material of the cell itself. Finally, the cell must be constructed in such a way that internal shorts between the anode material and cathode material cannot occur. The employment of structures to eliminate the possibility of internal shorts during manufacture is additionally advantageous for safety and to reduce production costs.

SUMMARY OF THE INVENTION

The present invention is directed to a structure for a dry cell battery arranged to isolate reliably the closure element from the container. To this end a first aspect of the present invention provides a seal operatively enclosing the closure assembly on all portions thereof facing toward or associated with the container. Compression of the seal may assist at appropriate locations. Compression of the seal may be achieved through advantageous forming techniques such as magnetic forming processes. In another aspect of the present invention a terminal associated with the closure assembly is coupled with the cell through a tab. The terminal then acts as a mandrel with the cell spiral wrapped thereabout so as to avoid internal shorting. A terminal of opposite polarity may be defined by interference contact between the cell and one end of the container. Assembly of the cell elements and introduction of the electrolyte to the cell while outside of the container may be advantageously practiced.

Batteries adhering to the principles of the present invention can provide a minimal possibility of internal shorting both during manufacture and in use, an integral seal for assuring closure of the cell container and safe response to thermal overloads. Other objects and advantages will appear hereinafter.

DETAILED DESCRIPTION OF THE PREFERRED EMBODIMENTS

Figure 1:
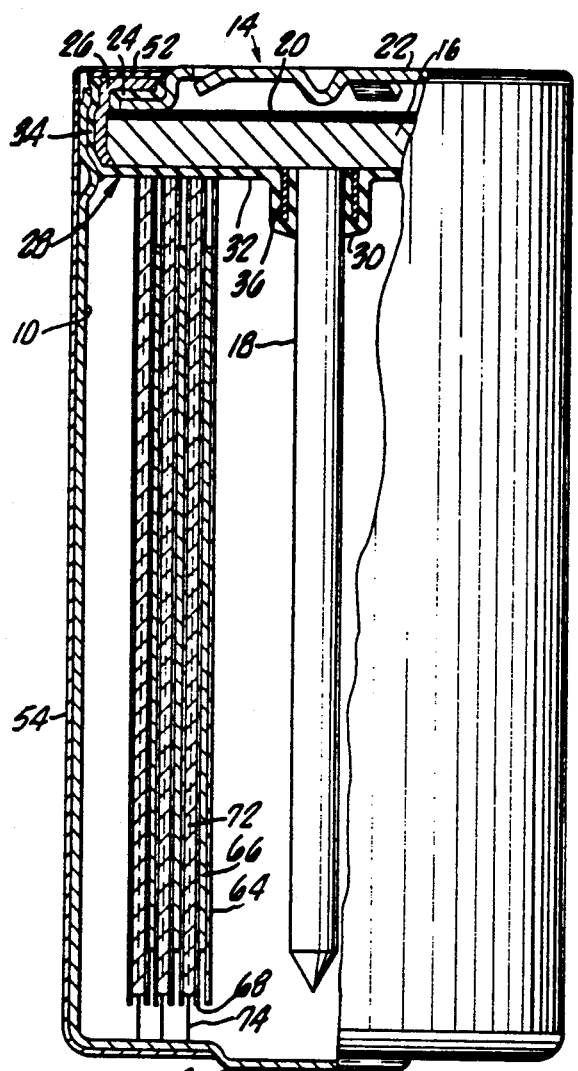
FIG. 1 is the front view of a battery of the present invention with a portion of the container, cell and closure illustrated in cross section.
Figure 2:
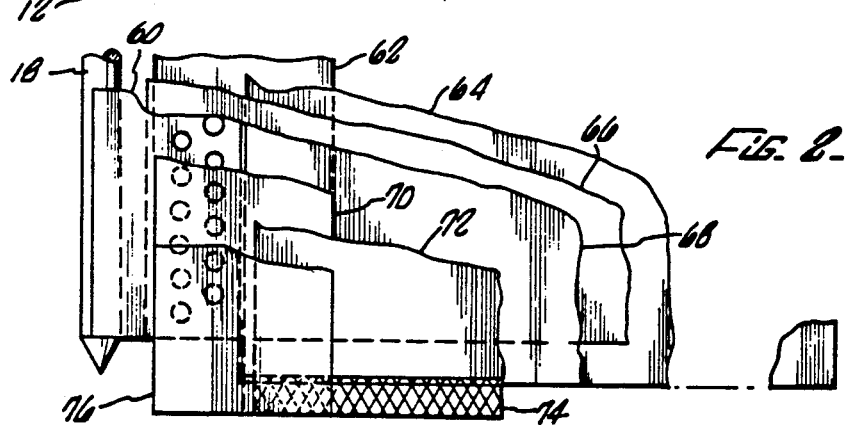
FIG. 2 is the plan view of cell materials associated with a mandrel/terminal prior to being wrapped.
Figure 3:
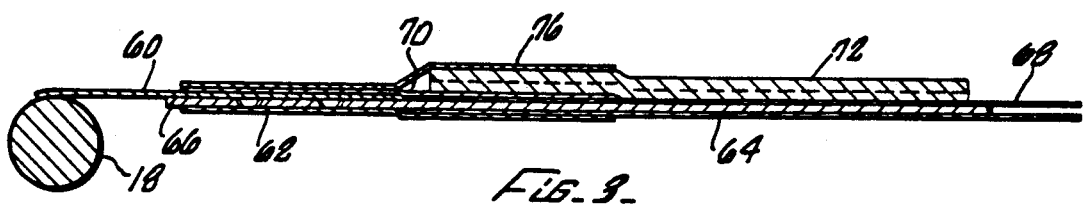
FIG. 3 is a cross-sectional view of the structure of FIG. 2.

Turning in detail to the drawings, FIGS. 1, 2 and 3 illustrate a first embodiment of the present invention. A container 10 defines the body of the dry cell battery. The container is generally cylindrical in shape and closed at one end with a formed, upraised contact 12. The container 10 may conveniently be formed of aluminum or plated low carbon steel. One end of the container 10 is open. A cap assembly, generally designated 14, is positioned in the opening in the container 10 with the container 10 then swaged to be compressed against the cap assembly 14 for permanent closure of the cell. Magnetic forming may be conveniently employed for this swaging operation.

The cap assembly 14 may be constructed prior to association with the container 10. The assembly 14 includes a plate 16 which is relatively rigid and substantially closes the opening in the container 10. With the container 10 being cylindrical, the plate 16 is formed into a circular disk. Welded to the plate 16 is a terminal 18 which extends concentrically into the container 10. The terminal 18 does not extend the full length of the container 10 in order that it avoids contact with the closed end of the container.

Assembled with the plate 16 is a thermal disconnect assembly 20. In this embodiment, the thermal disconnect assembly 20 is a positive temperature coefficient device. Such devices are designed to change state at a preselected temperature such that they are conductors below the preselected temperature and insulators above that temperature. In effect, this device operates as a safety switch against continued use of the battery under elevated internal battery temperatures.

A contact cap 22 is positioned on the thermal disconnect assembly 20. The contact cap 22 includes an upstanding contact area and an annular mounting flange. The mounting flange is designed to rest upon the thermal disconnect assembly 20 to insure electrical contact therewith. An annular insulator 24 is positioned on the mounting flange of the contact cap 22. The insulator extends over the outer edge of the flange fully about its periphery and upwardly on the cylindrical side of the contact portion of the contact cap 22 to insure complete electrical isolation from the remainder of the assembly. Thus, the sole electrical path between the contact cap 22 and the plate 16 is through the thermal disconnect assembly 20. An annular compression ring 26 is then positioned around the cap assembly 14 and swaged in place to interlock with the plate 16. The annular compression ring 26 includes a flange which interlocks with the thermal disconnect assembly 20, the mounting flange of the contact cap 22 and the insulator 24 to hold these elements onto the plate 16. As can be seen in FIG. 1, the insulator 24 is arranged to insure that there will be no contact between the annular compression ring 26 and the contact cap 22.

A nonconductive seal 28 is positioned about the cap assembly 14. The seal 28 may be of polypropylene. The seal 28 includes a central cylindrical portion 30 positioned at the plate 16 about the terminal 18. The seal 28 also includes a radially extending portion 32 which extends outwardly on the inner side of the plate 16 to its periphery. A peripheral cylindrical portion 34 extends upwardly about the periphery of the plate 16, outwardly of the annular compression ring 26. The peripheral cylindrical portion 34 extends up far enough such that it prevents the possibility of contact between the annular compression ring 26 and the container 10. Thus, the cap assembly 14 is electrically isolated from the container 10. The peripheral cylindrical portion 34 also provides a resilient barrier between the cap assembly 14 and the container 10. Thus, the nonconductive seal 28 provides electrical isolation as well as a mechanical sealing of the cell. The central cylindrical portion 30 includes a concentric cylindrical cavity into which is positioned a sleeve 36. The sleeve 36 is preferably metallic such that it may be compressed about the terminal 18. In the concentric cylindrical cavity of the nonconductive seal 28, the sleeve 36 is positioned such that a portion of the seal is located between the sleeve 36 and the terminal 18 and a portion of the seal encloses the sleeve. Thus, the sleeve 36 is isolated from the cell and may be of any convenient material such as aluminum, copper or low carbon steel and also is positioned to compress the seal 28 against the terminal 18 for additional sealing. To cause the compression of the sleeve 36, magnetic swaging techniques are preferred.

With the foregoing cap assembly 14, the seal 28 and the container 10, a battery cell enclosure is provided which insures electrical isolation of the end cap assembly from the main cavity of the cell with the exception of the terminal 18. By providing a rigid end cap in a sealed relationship with the container using a resilient material therebetween, a safer battery results. Under extreme thermal conditions, the end cap can be forced outwardly from the end of the container such that the wide mouth of the container 10 is open. Under conditions of fire, for example, this broad opening prevents disadvantageous accidental creation of a nozzle which would either propel the battery like a rocket or release a jet of combusting material. The seal 28 would melt if made of polypropylene. The container 10 is configured such that, without the seal, the cap assembly 14 is not in interlocking engagement therewith. Such a configuration assures proper operation of the battery under such adverse thermal conditions. In addition, the thermal disconnect assembly 20 is to be designed with a transition temperature well below the severe heat required to disassociate the cap assembly 14 from the container 10.

Figure 4:
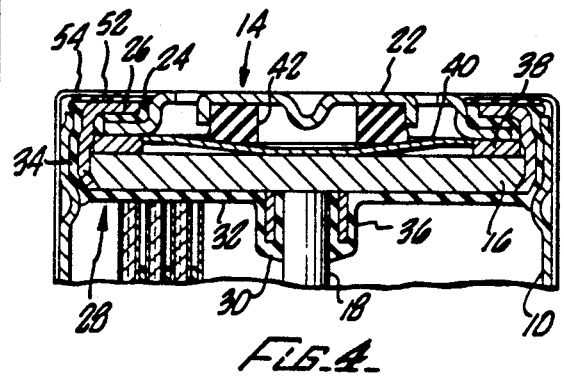
FIG. 4 is a cross-sectional front view of a closure of a second embodiment.
Figure 5:
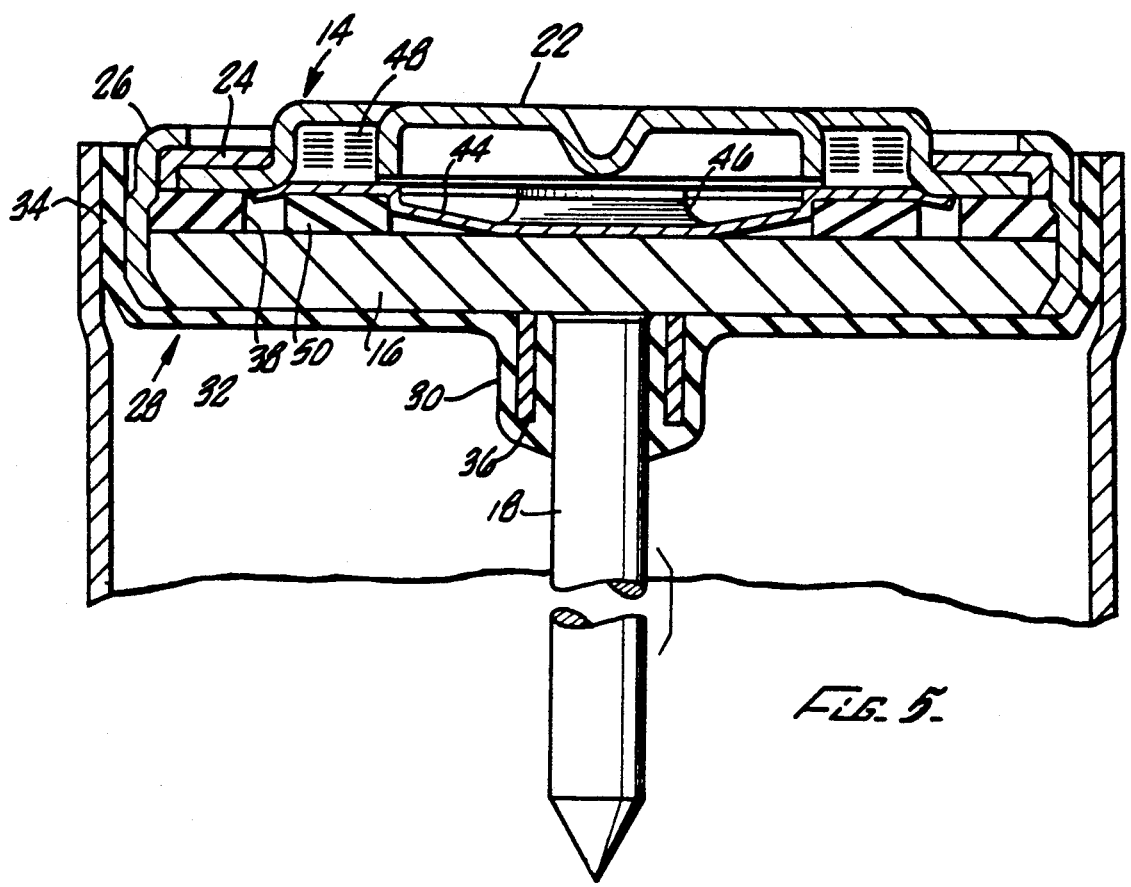
FIG. 5 is a cross-sectional front view of a closure of a third embodiment.
Figure 6:
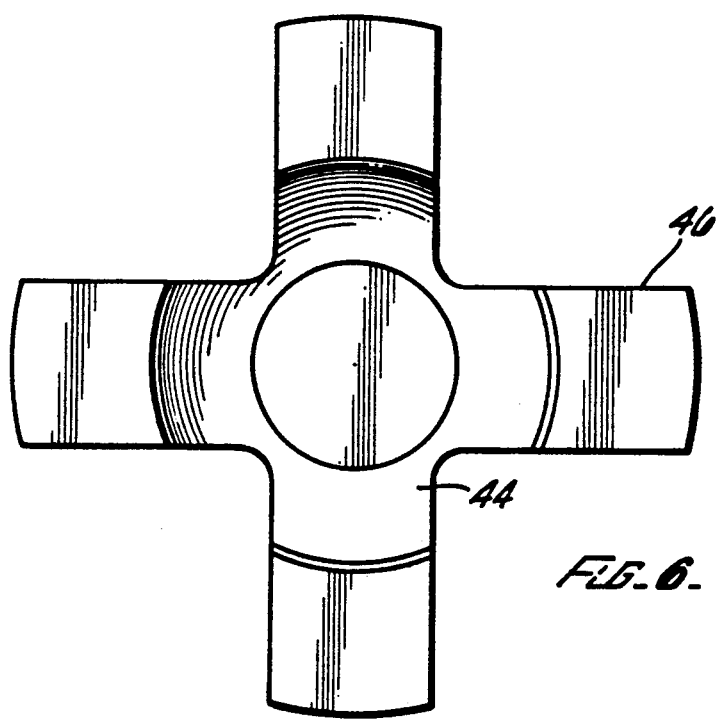
FIG. 6 is a plan view of the contact of the closure of FIG. 5.

Two additional embodiments of the cap assembly 14 are disclosed as illustrated in FIG. 4 and in FIGS. 5 and 6. An inspection of these additional embodiments illustrates that they employ the same general cap assembly 14 but for the thermal disconnect assembly mechanism employed. In the first embodiment, the thermal disconnect assembly 20 is contemplated to be a commercially available positive temperature coefficient device. In the embodiment of FIG. 4, the thermal disconnect assembly includes an annular insulating washer 38. This washer is positioned between the plate 16 and the contact cap 22. Located inwardly of the annular insulating washer 38 is a bimetal disc 40. The bimetal disc 40 is configured and has sufficient strength below a preselected temperature to contact the plate 16 at the center thereof and extend upwardly about the periphery to the contact cap 22 as illustrated in FIG. 4. Positioned between the contact cap 22 and the bimetal disc 40 is a resilient and nonconductive washer 42. This washer 42 is in compression. When the bimetal disc 40 is heated to a preselected temperature, the disc distorts to move away from the peripheral contact with the contact cap 22. The nonconductive washer 42 keeps the bimetal disc 40 from distorting asymmetrically. As the sole electrical path between the plate 16 and the contact cap 22 is through the bimetal disc 40, the battery is shut off above the preselected temperature.

The thermal disconnect assembly 20 of the third embodiment illustrated in FIGS. 5 and 6 employs a fusible washer designed to loose strength at a preselected elevated temperature. The thermal disconnect assembly includes an annular insulating washer 38 as in the second embodiment. A contact element 44 is arranged with dished contacts 46. The center of the contact element 44 is in contact with the plate 16. The contacts 46 extend to the contact cap 22 at the ends of each contact 46. The location of each contact 46 is determined by a compressed resilient washer 48 and a fusible washer 50. With the fusible washer below a preselected temperature, the resilient washer 48 is unable to move the contacts 46 away from the contact cap 22. Above a preselected temperature, the fusible washer 50 looses strength and the resilient washer 48 disconnects the contacts 46 from the contact cap 22.

Following the swaging operation to close the container 10 about the cap assembly 14, an insulator 52 is placed above the annular compression ring 26. A shrink fit label is positioned over the entire battery and heated to shrink it tightly against the assembly. The label is long enough to overhang the ends of the container 10. This allows retention of both the label 54 itself and the insulator 52. The use of such an insulating label and the insulator defines the electrical contacts only at either end of the battery.

Looking to the structure of the cell itself, reference is made to FIGS. 2 and 3. The terminal 18 is employed as a mandrel in the fabrication of the cell. In both FIGS. 2 and 3, the cell material is shown to be laid out in sheet form. This is the manner in which the assembly is constructed prior to being spiral wrapped around the mandrel defined by the terminal 18.

Associated with the terminal 18 by means of spot welding is a tab 60. The tab 60 runs substantially the length of the terminal 18 and extends in one direction from a tangential attachment. The tab 60 is preferably of formable metallic material. The tab 60 is prepunched with three corner rosettes along its extended portion for association with the anode.

Prior to welding of the tab 60 to the terminal 18, the cell is assembled in flat form. To fabricate the cell assembly, a first tape 62 is placed with the adhesive side up. Next a separator sheet 64 is positioned on the tape 62. The positioning is such that the separator sheet 64 overlaps only a portion of the tape 62. A lithium anode sheet 66 is then placed on the tape 62 and separator sheet 64 such that the anode sheet 66 extends just beyond the edge of the tape 62 as seen in FIG. 3. The separator sheet 64 is conveniently of polypropylene or other suitable material and is sufficiently porus to allow conventional battery operation. The anode sheet 66 has a first end adjacent the mandrel 18 and a second end at the opposite end of the sheet. Parallel side edges are appropriately spaced such that the anode sheet 66 does not extend to the edge of the separator sheet 64 or to the end thereof. In this way, the separator sheet prevents direct contact between the anode and the associated cathode.

With the anode sheet 66 in position, the tab 60 is positioned on the anode and the rosettes forced into the lithium. The tab 60 extends for only a short distance onto the anode sheet 66 to insure positive interlocking through the rosettes. The tab 60 extends beyond the anode sheet 66 at its first end for later welding to the terminal 18. The tab 60 is preferably arranged and proportioned with the diameter of the terminal 18 such that the rosettes do not overlay the cathode when spiral wrapped about the terminal 18. This prevents accidental contact by a rosette poking through the separator sheet 64 and contacting the cathode rather than either the terminal 18 or the prior pitch of the anode sheet 66.

Positioned on top of the anode sheet 66 is a second separator sheet 68. This second separator sheet 68 abuts against the tab 60 and extends coextensively with the first separator sheet 64. An insulating strip of tape 70 is then positioned over a portion of the tab 60 and a portion of the second separator sheet 68. The tape 70 is taped adhesive side down such that it will adhere to the tab 60 and to the second separator sheet 68 to retain it in position for assembly.

A cathode sheet 72 of magnesium dioxide or other suitable cathode material is positioned on top of the tape 70 and second separator sheet 68. As the second separator sheet 68 extends beyond the anode sheet 66, there is no direct contact between the cathode sheet 72 and the anode sheet 66. The cathode sheet 72 is also positioned such that it does not overlap the tab 60, thereby insuring against accidental contact through some flaw in the strip of tape 70. The cathode sheet 72 is made up of a substrate screen 74 and the cathode material. The substrate screen 74 extends beyond the separator sheets 64 and 68 on one side thereof as best seen in FIG. 2. Lastly, an upper strip of insulating tape 76 retains the cathode sheet 72 in place for assembly.

Once the foregoing sheets and tape is arranged, the tab 60 is spot welded to the terminal 18 and the terminal 18 acts as a mandrel to spiral wrap the cell assembly thereabout. The second separator 68 is preferably of additional length such that it will wrap about the cell bundle two extra wraps then heat sealed to form a closed package.

The cap assembly 14 with the attached terminal 18 and spiral wrapped cell is then subjected to a vacuum. The cell material is emersed in electrolyte and the vacuum is released. This causes the electrolyte to be drawn into the cell body. The wet cell body is then positioned in the container 10 which may have additional electrolyte if required. The fit is such that the substrate screen 74 associated with the cathode sheet 72 is placed into interference fit in a slightly crushed arrangement against the bottom of the container 10. This insures contact of the cathode with the contact 12. The insulator 52 is then placed and the shrink fit label 54 is positioned and contracted about the battery. The device is then complete.

Thus, a battery structure is defined which provides a complete seal of the cap assembly 14 from the container 10 and the interior of the battery with the exception of the protruding terminal 18. This seal provides an appropriate physical closure between the cap assembly 14 and the container 10 as well as electrical isolation. The extension of the terminal 18 provides a convenient mechanism for the fabrication of the cell material in such a way that internal shorting is again eliminated. The plate 16 in association with the container 10 provides a closure which, under extreme temperature, properly may be ejected such that a nozzle is not created through which combusting materials may be improperly directed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A battery comprising
  a container having an opening therein;
  a plate positioned in said opening;
  a terminal attached to said plate and extending into said container;
  a sleeve concentrically positioned about said terminal;
  a nonconductive seal positioned about said terminal against said plate and between said sleeve and said terminal and extending in substantially juxtaposition with said plate to about the periphery of said plate between said plate and said container in said opening, said sleeve being compressed about said terminal to seal said container at said terminal.

2. The battery of claim 1 wherein said sleeve is magnetically swaged about said terminal and is insulated from the interior of said container.

3. The battery of claim 1 wherein said seal extends from inwardly of said sleeve to around said sleeve and then outwardly to the periphery of said plate.

4. The battery of claim 1 wherein said container is cylindrical, said terminal is concentrically positioned in said container and said plate is a circular disc.

5. The battery of claim 1 wherein said seal is constructed to include a central cylindrical portion, a radially extending portion and a peripheral cylindrical portion, said central cylindrical portion including a concentric cylindrical cavity closed at a first end most distant to said plate and open at a second end most proximate to said plate, said sleeve being in said cavity.

6. The battery of claim 1 wherein said container is compressed about the periphery of said plate with said seal therebetween.

7. A battery comprising
  a container having an opening therein;
  a plate positioned in said opening;
  a terminal attached to said plate and extending into said container;
  a sleeve concentrically positioned about said terminal;
  a nonconductive seal positioned about said terminal between said sleeve and said terminal and extending outwardly to about the periphery of said plate between said plate and said container in said opening, said sleeve being compressed about said terminal and being insulated from the interior of said container;
  a contact cap positioned on said plate outwardly of said container and an annular compression ring about said plate and extending to interlock with said cap on one side of said plate and with said plate on the other side thereof, said ring being inwardly of said container and said seal at said opening.

8. The battery of claim 7 further comprising a thermal disconnect assembly between said cap and said plate, said cap and said plate being electrically coupled only through said thermal disconnect assembly.

9. The battery of claim 7 wherein the outside dimensions of said ring are less than the corresponding inside dimensions of said container at said opening, said nonconductive seal being in interlocking engagement with both said ring and said container at said opening.

10. A battery comprising
a container having an opening therein;
a plate positioned in said opening;
a terminal attached to said plate and extending into said container;
a nonconductive seal positioned about said terminal and extending radially coextensive with said plate to about the periphery of said plate between said plate and said container in said opening;
a tab attached to said terminal;
an anode sheet attached to said tab;
first and second separator sheets, each said sheet being on one side of said anode sheet;
a cathode sheet on a first side of said anode sheet with a said separator sheet therebetween, said anode sheet, said cathode sheet and said separator sheets being spiral wrapped about said terminal.

11. The battery of claim 10 wherein said tab is welded to said terminal.

12. The battery of claim 10 wherein said anode sheet has two parallel side edges, a first end to which said tab is affixed and a second end, said separator sheets extending beyond said anode sheet on said two side edges and said second end.

13. The battery of claim 12 wherein said cathode sheet includes a substrate screen and cathode material adhered to said substrate screen, said screen extending beyond said cathode material and said separator sheets to an interference engagement with said container.

14. A battery comprising
a container having an opening therein;
a plate positioned in said opening;
a terminal attached to said plate and extending into said container;
a sleeve concentrically positioned about said terminal at said plate;
a nonconductive seal constructed to include a central cylindrical portion positioned about said terminal, a radially extending portion coextensive and in substantial juxtaposition with said plate and a peripheral cylindrical portion extending about the periphery of said plate between said plate and said container in said opening, said sleeve being compressed about said terminal to seal said container at said terminal with a portion of said seal between said sleeve and said terminal;
a tab attached to said terminal;
an anode sheet attached to said tab;
first and second separator sheets on opposite sides of said anode sheet;
a cathode sheet on a first side of said anode sheet with a said separator sheet therebetween, said anode sheet, said cathode sheet and said separator sheets being spiral wrapped about said terminal.

15. The battery of claim 14 wherein said cathode sheet includes a substrate screen and cathode material positioned on said screen, said screen extending beyond said cathode material and beyond said separator sheets on a first side to an interference engagement with said container.

16. A battery comprising
a container having an opening therein;
a plate positioned in said opening;
a terminal attached to said plate and extending into said container;
a sleeve concentrically positioned about said terminal;
a nonconductive seal positioned about said terminal between said sleeve and said terminal and extending to about the periphery of said plate between said plate and said container in said opening, said sleeve being compressed about said terminal and said plate being noninterlocking with said container in said opening, said nonconductive seal mounting said plate in said opening of said container with said nonconductive seal being in interlocking engagement with said opening in said container.

17. A battery comprising
a container having an opening therein;
a cap assembly positioned in said opening;
a terminal attached to said cap assembly and extending into said container;
a sleeve concentrically positioned about said terminal;
a nonconductive seal positioned about said terminal extending to between said sleeve and said terminal and extending to about the periphery of said cap assembly between said cap assembly and said container in said opening, the outside dimensions of said cap assembly being less than the corresponding inside dimensions of said container at said opening, said nonconductive seal being in interlocking engagement with both said cap assembly and said container at said opening.

* * * * *